April 4, 1967 H. C. A. VAN DUUREN 3,312,937

LINE TELEGRAPH SYSTEM WITH ERROR CORRECTION

Filed Dec. 13, 1962 3 Sheets-Sheet 1

INVENTOR.
H. C. A. VAN DUUREN
BY Hugh A. Kirk
ATTORNEY

INVENTOR.
H. C. A. VAN DUUREN
BY Hugh A. Kirk
ATTORNEY

INVENTOR.
H. C. A. VAN DUUREN
BY Hugh A. Kirk
ATTORNEY

United States Patent Office 3,312,937

Patented Apr. 4, 1967

3,312,937

LINE TELEGRAPH SYSTEM WITH ERROR CORRECTION

Hendrik Cornelis Anthony van Duuren, Wassenaar, Netherlands, assignor to De Staat der Nederlanden, ten deze vertegenwoordigd door de directeur-generaal der Posterijen, Telegrafie en Telefonie, The Hague, Netherlands Filed Dec. 13, 1962, Ser. No. 244,354
Claims priority, application Netherlands, Dec. 15, 1961, 272,613
9 Claims. (Cl. 340—146.1)

The invention relates to a line telegraph system with error correction by automatic repetition of multilated signals.

The object of this invention is to adapt a line telegraph system to an automatic error correction system so that the line telegraph system can also be used for data transmission. According to the invention, upon reception of a mutilated signal, a station blocks its teleprinter and applies to the line a "start" polarity of a duration shorter than that of a clearing signal, but longer than that of the longest information signal of this polarity, in order to effect at the other station the initiation of the repetition of the signal received mutilated. This repetition should include also that repetition of all the signals which followed the mutilated signal which signals were already transmitted meanwhile, but not yet printed. The said "start" polarity is obtained by applying a potential difference between the wires to the local repeater, in such a way that through the subscriber's repeater circuit there flows a current which is equal but contrary to the current flowing in this circuit in the case of "stop" polarity. So like in a radio system, the error correction is effected automatically, when asked for by means of a special request for repetition or RQ signal. This RQ signal is given by changing over an RQ change-over contact in the local circuit of the teleprinter, as a result of which changeover a connection of the teleprinter coil to one end of the local circuit is broken and a pole of the local battery is connected instead, putting the outgoing line in "start" condition.

The above mentioned and other features and objects of this invention and the manner of attaining them will become more apparent and the invention itself will be understood best by reference to the following description of an embodiment of the invention taken in conjunction with the accompanying drawings, wherein.

Figure 1:
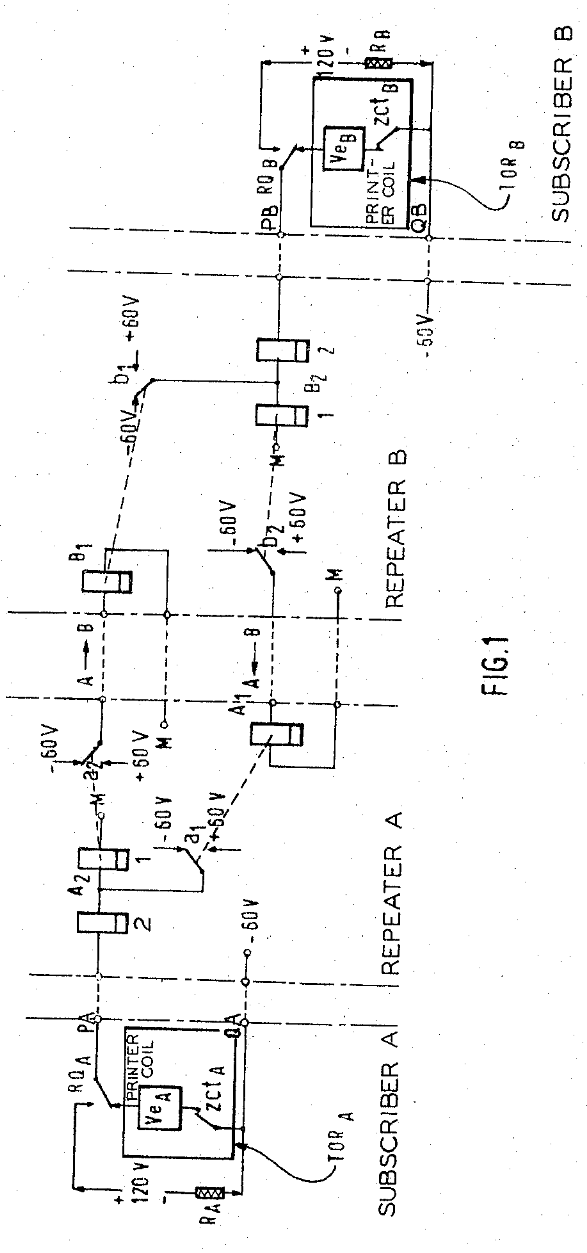
FIG. 1 is a schematic wiring diagram of a line telegraph system adapted for automatic error correction accordiing to the present invention showing the connection passing from a subscriber's station A via a local repeater A, a four-wire circuit, and a local repeater B to a subscriber's station B.

The general circuit shown in FIG. 1 is that used in a switched telegraph network, such as Telex service on the European continent, wherein subscribers A and B include $TOR_A$ and $TOR_B$ circuits at the left and right, respectively, of this figure. These two subscribers A and B are in correspondence with each other via their local repeater circuits A and B which repeaters are coupled by means of a four-wire circuit; two wires "go" and two wires "return" of a standard line telegraph system. The circuits of each subscriber that are connected to the two wires P and Q of the repeater line, include a printer coil $Ve_A$ or $Ve_B$ in series with the keyboard contacts $zct_A$ or $zct_B$, respectively, which are directly connected between the line terminals PA and QA or PB and QB of the repeater lines.

In the circuits of each of the repeaters A and B, the switches $a_1$ and $a_2$ in repeater section A and the switches $b_1$ and $b_2$ in the repeater section B, are shown in their positioins for sending out "start" signals, that is, a minus 60-volt (−60-v.) polarity, and these switches are put into these positions when their corresponding relays $A_1$, $A_2$, $B_1$, and $B_2$ are energized to their "start" polarities.

The operation of these relays $A_1$, $A_2$, $B_1$ and $B_2$ in repeater circuits A and B shown in FIG. 1 will be described by first assuming that subscriber A is transmitting to subscriber B so that subscriber B does not operate his keyboard contacts $zct_B$ so as not to interfere with the incoming signals from subscriber A. The circuit for subscriber B then operates as follows: The −60 v. from repeater B which is connected to terminal QB in subscriber station B is connected through the normally closed $zct_B$ keyboard switch and thence through the printer coil $Ve_B$, or in other words through the $TOR_B$ subscriber circuit, and through the switch $RQ_B$ to the line terminal PB to the repeater B, and therein through coil 2 of relay $B_2$ and switch $b_1$ to the positive 60-volt (+60 v.) contact, if relay $B_1$ is in the "stop" position. This circuit energizes $2n$ windings of coil 2 of relay $B_2$ in the "stop" direction. However, simultaneously the +60-v. contact of switch $b_1$ also energizes coil 1 of $n$ windings of relay $B_2$ to neutral or 0 (zero) terminal M in the "start" direction. The potential of terminal M is half way between the plus and minus 60-volt terminals. Although winding or coil 1 of relay $B_2$ is energized in the "start" direction, its $n$ windings are cancelled out by the $2n$ windings in the "stop" direction of the coil 2 of relay $B_2$, so that the net result of the operation of relay $B_2$ will be held in its "stop" position, i.e. $2n$ "stop" subtracted from $n$ "start" equals $n$ ampere turns of "stop."

On the other hand, with the switch $b_1$ in the repeater circuit B contacting its other or −60-v. contact, or in other words when switch $b_1$ is in its "start" position, the coil 2 of $2n$ windings of the relay $B_2$ is now short circuited through the above traced circuit to the −60-v. terminal connected to the line terminal QB. However, the −60-v. is conducted through coil 1 of $n$ windings of the relay $B_2$ to energize this coil 1 into its "stop" position by $n$ ampere turns, as a result of which the relay $B_2$ still remains in its "stop" condition, regardless of which position the switch $b_1$ is in.

This means that opening and closing of the key $zct_A$ in the subscriber station A, which correspondingly changes the energiaztion of relay $B_1$ in the repeater circuit B to correspondingly change the contacts of switch $b_1$, has no influence whatsoever upon the "stop" condition of the relay $B_2$ in repeater B, and a normal "stop" condition is maintained on the line conductors between the subscribers and their repeaters, so that the potential on line PA will be positive with respect to that on the line QA throughout the transmission of the message from subscriber A. This is obtained through the switch $b_2$ of the relay $B_2$ in repeater B always being in its "stop" position against its +60-v. contact so as to energize relay $A_1$ in repeater A so that its switch $a_1$ also is always against its +60-v. contact. This therefore always applies a positive voltage to the line PA connecting the repeater A with subscriber A, so that it will remain positive with respect to the line QA, which line QA is continuously connected to −60-v. terminal.

When the subscriber $TOR_A$ transmits by opening ("start") and closing ("stop") the transmitting contact $zct_A$, the current flow through the teleprinter coil $Ve_A$ and through the winding 2 of the polarized relay $A_2$ is interrupted. This is a "start" criterion for the coil $Ve_A$; at the same time the relay $A_2$ is energized in the "start" direction by $n$ ampere-turns resulting from the current flow through the coil 1 from +60-v. to the center M terminal of the battery.

When the contact $zct_A$ is closed, a circuit is completed passing from +60-v., via contact $a_1$, the coil 2 of relay $A_2$, the coil $Ve_A$ and contact $zct_A$ to −60-v., which is a "stop" criterion for the coil $Ve_A$. Now the energization of the coil 2 of relay $A_2$ amounts to $2n$ ampere-turns in the "stop" direction, so that the total energization of relay $A_2$ amounts to $n$ ampere-turns in the "stop" direction.

In the former case the switch $a_2$ of relay $A_2$ contacts the −60-v. terminal (start); in the latter case it is laid on the +60-v. contact (stop). When it lies on the −60-v. contact, polarized relay $B_1$ is maintained in the position shown and the relay $B_2$ remains energized through the coil 1 by $n$ ampere-turns in the "stop" direction, the coil 2 being dead. The coil $Ve_B$ is dead too, which means a "start" criterion for $Ve_B$. When the switch $a_2$ contacts the +60-v. terminal, relay $B_1$ is changed as is its contacts $b_1$, but relay $B_2$ remains energized in the "stop" direction.

It appears, consequently, that when the subscriber A is transmitting, relay $A_2$ is energized in the transmitting rhythm, relay $B_2$ remains in the "stop" condition throughout. So the switch $b_2$ of this relay $B_2$ remains on the +60-v. (stop) contact. Thus at station A the point PA has always a positive potential with respect to the point QA. This potential difference, however, disappears when the switch $b_2$ closes the −60-v. contact. This happens e.g., when the subscriber $B_2$ transmits a start element. Thus from the above it is made clear that the only means of sending "start" polarity is, to energize relays $A_2$ or $B_2$ to their "start" position, which in turn can only be done by interrupting the subscriber's circuit over which the signals are being received.

The invention now relates to such a system in which in the subscribers' station A and B of the teleprinter apparatus shown in FIG. 1 have been replaced by the error correcting telegraph equipment $TOR_A$ and $TOR_B$ as well as the change-over switches $RQ_A$ and $RQ_B$ and 120 positive potential connected to them. With the switches $RQ_A$ and $RQ_B$ in the positions shown, the potential difference between the points PA and QA will be maintained so that the potential of PA is more than that of QA during the transmission of $TOR_A$. This potential difference disappears, however, when for some reason or other, the switch $b_2$ of relay $B_2$ contacts the −60-v. terminal (start), as a result of an interruption in the line between the subscriber's station A and the local repeater. Thus if the (receiving) station $TOR_B$ detects a mutilated signal, it signals the error to the station $TOR_A$ by forcing the relay $B_2$ to the "start" position by means of the contact $RQ_B$. The station $TOR_A$ detects the disappearance of the code by the potential difference between PA and QA and initiates a "repetition cycle," which starts by the transmission of a special signal, the signal "I" (in this case called BQ signal) followed by the last seven last-transmitted signals in the correct sequence. When detecting the mutilated signal the station $TOR_B$ has initiated a blocking cycle, which comprises eight signals. This implies that the signal received mutilated and the seven signals that follow are neither printed nor passed on.

Thus when the far end subscriber or receiver subscriber B transmits a "start" criterion or element instead of the continuous "stop" polarity or condition, and the subscriber A is transmitting a "stop" element or signal so that switch $b_1$ is in its "stop" or +60-v. position, then the breaking of the circuit to relay $B_1$ by opening the error detecting switch $RQb$, will cause the switch $b_2$ to change to its −60-v. contact, which in turn changes the energization of relay $A_1$ in repeater A to change its switch $a_1$ over from its +60-v. contact to its −60-v. contact, so that the potential on line or terminal PA is no longer positive with respect to the terminal QA but is connected to the same negative potential, −60-v.

However, if the signal from subscriber A is a "start" (−60-v. at switch $b_1$) element or signal at the very moment that a "start" (−60-v.) element has to be transmitted brack from B to subscriber A to indicate an error, the opening of the circuit to relay $B_2$ has no effect because its coil 2 already has no current flowing through it. Accordingly, the relay $B_2$ remains in its "stop" condition through its coil 1, and no change-over of switch $b_2$ to transmit a "start" potential to subscriber A can be effected. In order to avoid this disadvantage, the present invention aims at forcing the relay $B_2$ into its "start" condition when an RQ signal must be transmitted, thereby over-riding any "start" element which may simultaneously be transmitted at the time a "start" condition is to be retransmitted from the receiving subscriber back to the transmitting subscriber. In order to do this, a double positive voltage of 120 volts is connected to the RQ switches $RQ_A$ and $RQ_B$ at each subscriber's station. Then in the present instance, when the $RQ_B$ switch is operated, a +120 volts flows through the terminal PB and coil 2 of relay $B_2$ to −60-v. terminal so that the $n$ ampere turns of coil 1 of relay $B_2$ connected between 0 and −60 volts is more than overcome by the voltage between −60 and +120 volts now passing through the $2n$ ampere turns of coil 2 of relay $B_2$ forcing the relay $B_2$ into its "start" position.

Correspondingly when the contact $b_1$ is in its "stop" position, (that is at its +60-v. contact), current flows through the coil 2 of the relay $B_2$ from the +120 volts to the +60 volts, energizing the relay $B_2$ to "start" position with roughly $n$ ampere turns through coil 2, and also through the coil 1 of the relay $B_2$ of $n$ ampere turns between +60 and 0 volts, so that the result is roughly $2n$ ampere turns energizing to "start" position also. Therefore, under all keying position, the operation of switch $RQ_A$ or $RQ_B$ energizes the relay $A_2$ or $B_2$ to its "start" position, insuring the transmission of a signal requesting a repetition because of the detection of an error.

Figure 2:
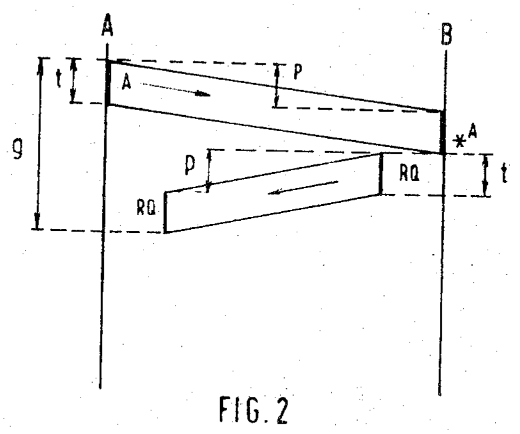
FIG. 2 is a schematic time diagram of the transmission of a request for repetition or RQ signal.

In FIG. 2 it is assumed the symbol A (duration $t$ milliseconds (ms.)) is received mutilated (*) at station B. This is observed $p+t$ milliseconds (ms.) after the beginning of the transmission from station A, $p$ being the propagation time in the direction A→B, which is supposed to be equal to the propagation time in the direction B→A. The station B can immediately transmit the RQ-signal, which, for the sake of simplicity, is supposed to last $t$ milliseconds also. This signal is detected at station A after another interval of $p+t$. Thus during the interval $g$, however, signals have been transmitted by station A, but station A always stores the signals transmitted during the last time interval $g$ in a memory, in order to repeat them on request.

As appears from FIG. 2, $$g=2t+2p \text{ or } p=\tfrac{1}{2}g-t$$

In this expression $g$ must be a multiple of $t$ $$p=\tfrac{1}{2}nt-t$$

For whole positive values for $n$, the propagation time that can be bridged is as follows:

| n | p | ms. |
|---|---|---|
| 2 | 0 | 0 |
| 3 | ½ t | 70 |
| 4 | t | 140 |
| 5 | 1½ t | 210 |
| 6 | 2 t | 280 |
| 7 | 2½ t | 350 |
| 8 | 3 t | 420 |

Figure 3:
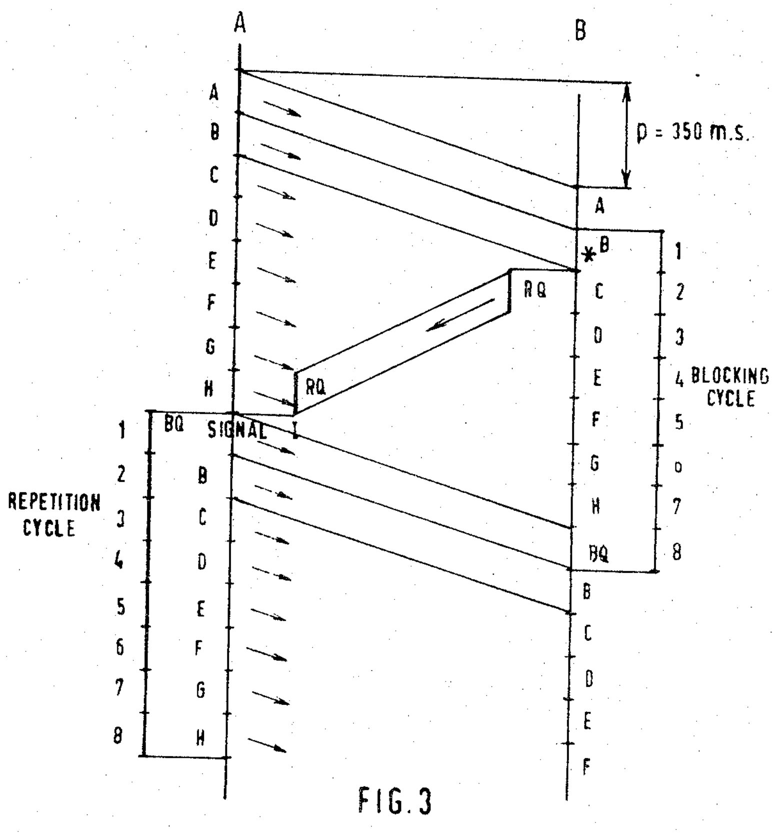
FIG. 3 is a schematic time diagram of a complete repeating and blocking cycle according to the system of this invention.

A memory for seven signals has been chosen, which implies a propagation time of 350 ms. in either direction. As an RQ-signal is to precede, the repetition cycle must comprise eight signals, which is at the same time duration of the blocking cycle, which is illustrated in FIG. 3.

The TOR installation have memory functions filled by perforated tape in the copending U.S. patent application Ser. No. 226,358, filed Sept. 26, 1962 assigned to the same assignee as this application, and now U.S. Patent No. 3,274,337, issued Sept. 20, 1966.

Figure 4:
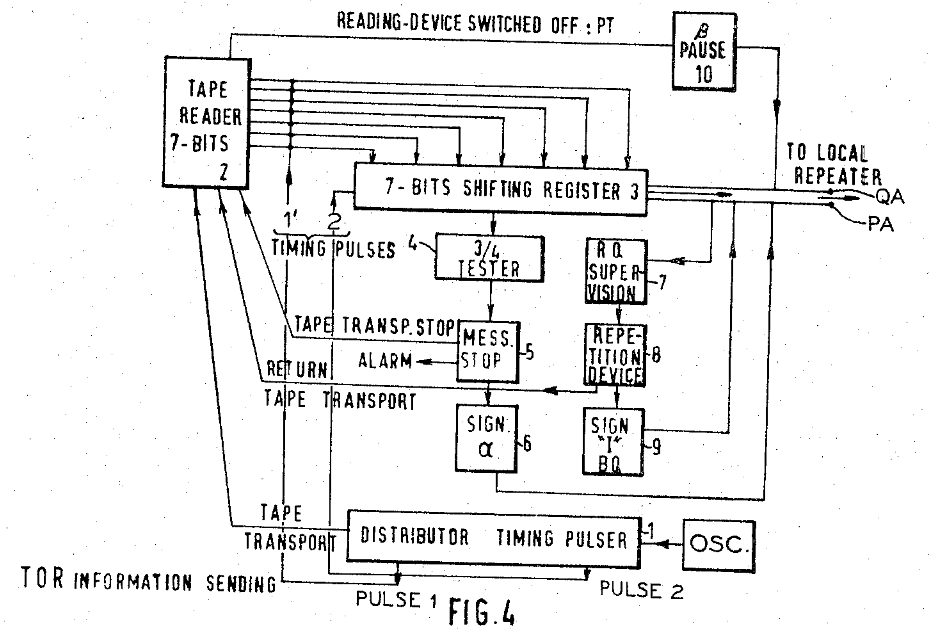
FIG. 4 is a schematic block wiring diagram of the basic units of an information-sending station for one embodiment of an automatic error correcting system as shown in FIG. 1.

FIG. 4 shows the information-sending functions of the error correcting telegraph equipment TOR. A distributor and timing-pulse program circuit 1 controlled by a generator governs the functions of the TOR.

Once in every 140 ms. the code tape in the tape reader 2 is advanced by one symbol. The code elements of the symbol to be transmitted are recorded simultaneously in the 7 bits shift register 3 by the timing pulse 1′. The timing pulses 2, which appear every 20 ms. effect the sequential delivery of the recorded information to the local repeater. This action fails to occur, if the tape reader has been switched off, or if there is no tape in the tape reader. In that case a $\beta$ pause generator 10 continually supplies a pause signal (idle time symbol), which is also a signal of the three-out-of-seven code, to the local repeater.

During the transmission of each 3-out-of-7-signal the ratio of marking elements and spacing elements is checked by the 3/4-tester 4. If a deviation from the 3/4-ratio is found, the message is stopped by means of the device 5, which starts a signal $\alpha$ generator 6 transmitting continually a "stop" signal to the local repeater. At the same time a local alarm is given. This condition ends, when the tape may be removed, due to which the pause condition sets in, in which pause signals $\beta$ are then transmitted. The removed tape or message can be checked for perforating errors and reperforated, if necessary. The RQ-supervisory equipment 7 supervises the line to the local repeater for the occurance of an RQ criterion or a request for repetition. When such a criterion is observed, the repeating device 8 is actuated. This device generates a repetition cycle lasting eight signals and falling in behind the last symbol transmitted. By means of the signal "I" generator 9, a BQ signal is transmitted as the first signal in the repetition cycle, the code tape in this period being moved back by seven symbols, after which these seven symbols are normally transmitted to complete the repetition cycle.

An RQ criterion recorded during the repetition cycle, however, produces no reaction.

Figure 5:
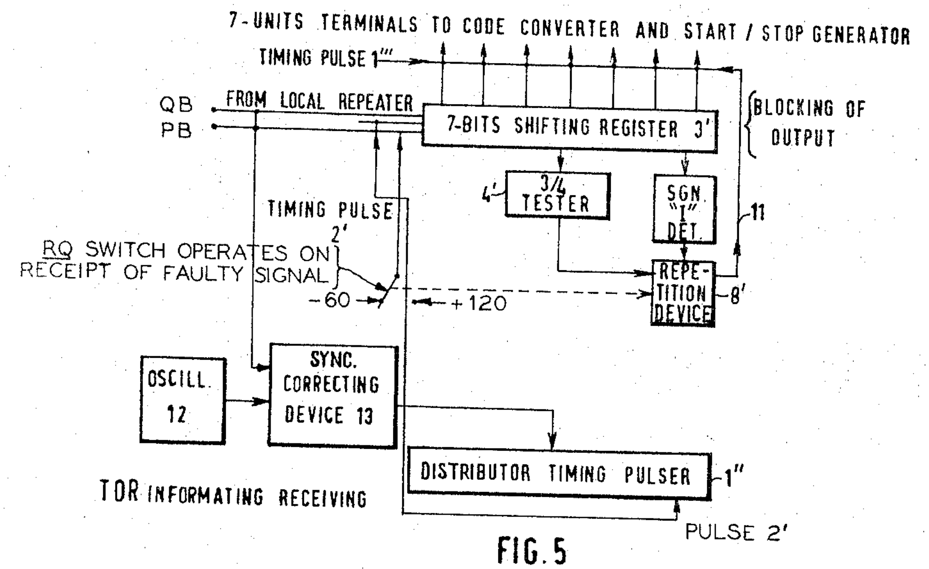
FIG. 5 is a schematic block wiring diagram of the basic units of an information-receiving station for the embodiment of the automatic error correcting system shown in FIG. 4.

FIG. 5 illustrates the information-receiving functions of the error correcting telegraph equipment TOR. As the functions of the information-sending TOR, in the information receiving TOR are governed by a distributor and a time pulse program circuit 1 controlled by the local generator 12. Here, however, a synchronization correction derived from the received signals is applied to the pulse program controlling or correcting device 13, because the timing-pulses must remain in phase with the received signal.

The signal received from the local repeater is applied to the 7 bits shifting register 3′, while the timing pulses 2′, appearing every 20 ms., shift the information into this register 3′. When an entire signal has been recorded in the register 3′, the code elements of this signal are read out simultaneously by the timing pulse 1‴, which appears once every 140 ms. This read-out signal is applied to a buffer or to a code converter (not shown) wherein each of the coded signals is provided with a "start" element and a "stop" element, and then are applied sequentially to a teleprinter or a perforator.

When shifted into the register 3′ each symbol is checked in the 3/4 tester 4′ as regards the mark-space ratio. If the received signal proves to exhibit another mark-space ratio than 3/4, the repetition device 8′ is activated. This device generates a blocking cycle of 8 signals, so that the signal received mutilated and the following seven signals do not pass the output terminals via conductor 11. At the same time an RQ signal is immediately transmitted by closing switch RQ (i.e. RQB or RQA at station B or A, respectively) to apply a "start" potential of a +120 volts on the PB (or PA) conductor for at least 20 milliseconds, so as to indicate that an erroneous signal has been received and that a repetition thereof is requested by starting with the generation of a special signal "I". Possible signals received mutilated during the blocking cycle, however, produces no reaction.

Thus if an information-receiving TOR receives a BQ signal (signal "I"), it is reacted to as if a symbol was received mutilated, provided this signal "I" is not received during the blocking cycle.

Nearly all the devices, such as the distributors, the shift registers, the 3/4 tester, the repetition device, etc. that are used in the information-sending TOR, can also be used in the information-receiving TOR.

Consequently one type of TOR equipment can easily be designed for use in either an information-sending station or an information-receiving station, as desired.

While I have illustrated and described what I regard to be the preferred embodiment of my invention, nevertheless it will be understood that such is merely exemplary and that numerous modifications and rearrangements may be made therein, without departing from the essence of the invention, I claim, 1. An error correction system for the telecommunication of multi-element binary code signals, which binary code elements comprise "stop" and "start" signals of different potentials, said system being for a line telegraph system having relays $A_1$, $A_2$, $B_1$, $B_2$ which transmit said "start" and "stop" signal element in one direction at a time between two stations, said system comprising:

(A) a transmitter and a receiver at each station A and B, (B) means 2 for storing a predetermined number of signals at each transmitter after said number of signals have been transmitted, (C) relay means (A2, B2) in each receiver for maintaining that receiver in its "stop" signal potential condition during reception of both "start" and "stop" signal elements by said relay means, (D) means 4′ for testing the correctness of each signal as it is received by each receiver, (E) the improvement comprising: means responsive to said testing means for testing an incorrectly received signal for switch means 8′, RQ operating said relay means for changing the "stop" signal potential condition to a "start" signal potential condition for a duration of time between that of a signal element and a multi-element signal, regardless of whether "stop" or "start" signal elements are being received, (F) means 7 for detecting said change in potential condition of said receiver at said transmitter, and (G) means 8 to repeat said predetermined number of stored signals from said transmitter in response to said detecting means detecting said change in condition in said receiver.

2. A system according to claim 1 wherein said storing means comprises a tape and wherein said means to repeat said tape includes means for returning said tape.

3. A system according to claim 1 wherein said multi-element code signals comprise a constant ratio of binary elements.

4. A system according to claim 1 wherein said means responsive to said testing means 8′ 11′ includes means for blocking the reception of further signals until the signal tested to be in error has been tested to be correctly reecived.

5. A system according to claim 1 including means 4 at said transmitter for checking the correctness of the signals before they are transmitted.

6. A system according to claim 1 including means 10 to transmit a special idle time signal B from said transmitter.

7. A system according to claim 5 including means 6 responsive to said transmitter checking means to transmit a special "stop" signal $\alpha$ from said transmitter to indicate to the receiver that message transmission has been stopped when an error in the signal to be transmitted has been detected.

8. A system according to claim 1 including means 9 at each transmitter to transmit a special repetition signal "I" at the start of a repetition of said predetermined signals.

9. A system according to claim 8 including means 3′ at each receiver for detecting said special repetition signal "I."

References Cited by the Examiner

UNITED STATES PATENTS

| | | | |
|---|---|---|---|
| 3,001,018 | 9/1961 | Van Dalen | 340—146.1 |
| 3,077,579 | 2/1963 | Green | 235—153 |
| 3,154,638 | 10/1964 | Van Dalen | 340—146.1 |

ROBERT C. BAILEY, *Primary Examiner.*

M. LISS, J. P. VANDENBURG, *Assistant Examiners.*